May 31, 1966 J. G. BARRAT 3,253,392
FRUIT HARVESTING DEVICE
Filed Oct. 15, 1963 3 Sheets-Sheet 1
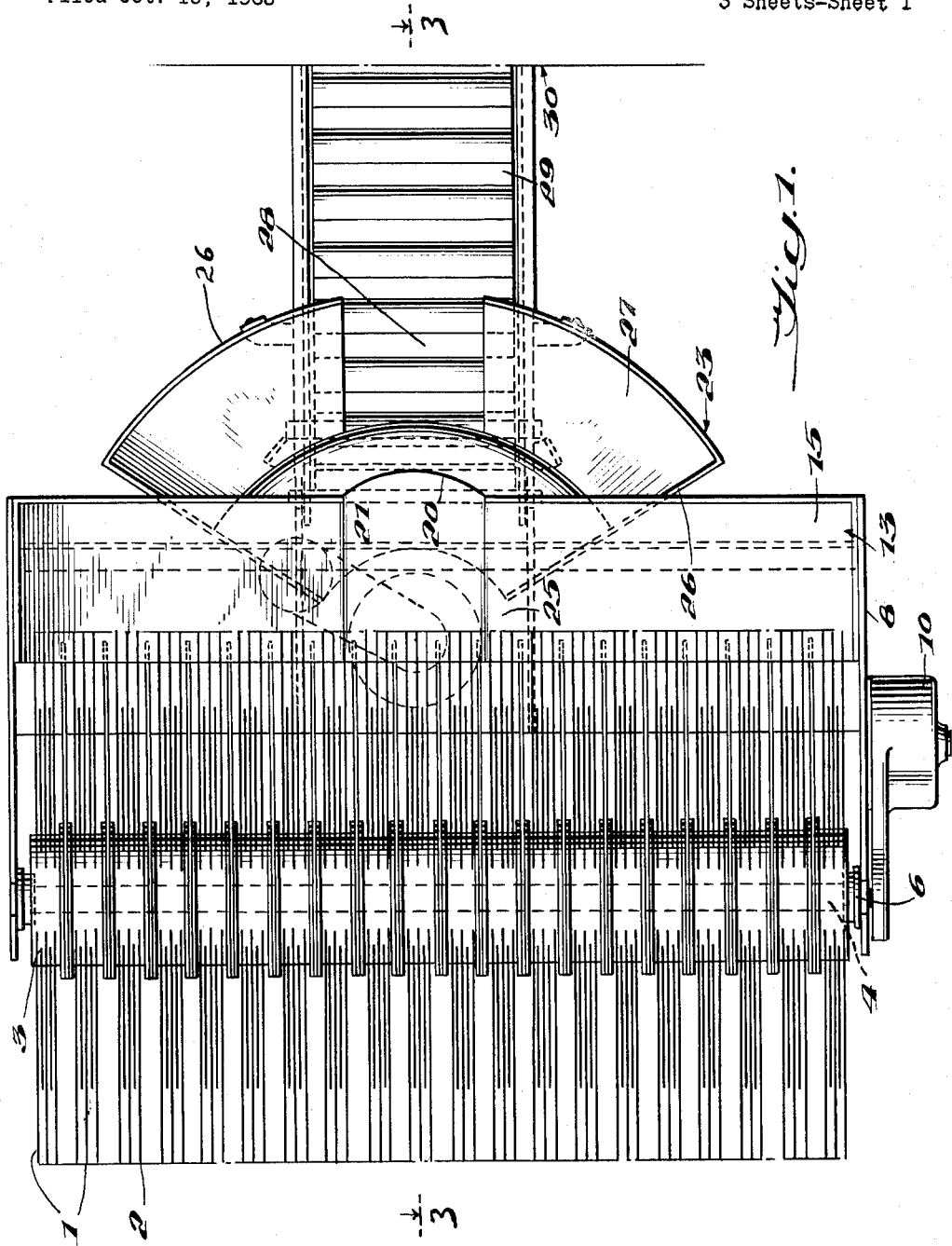
INVENTOR
Joseph G. Barrat
BY
ATTORNEY

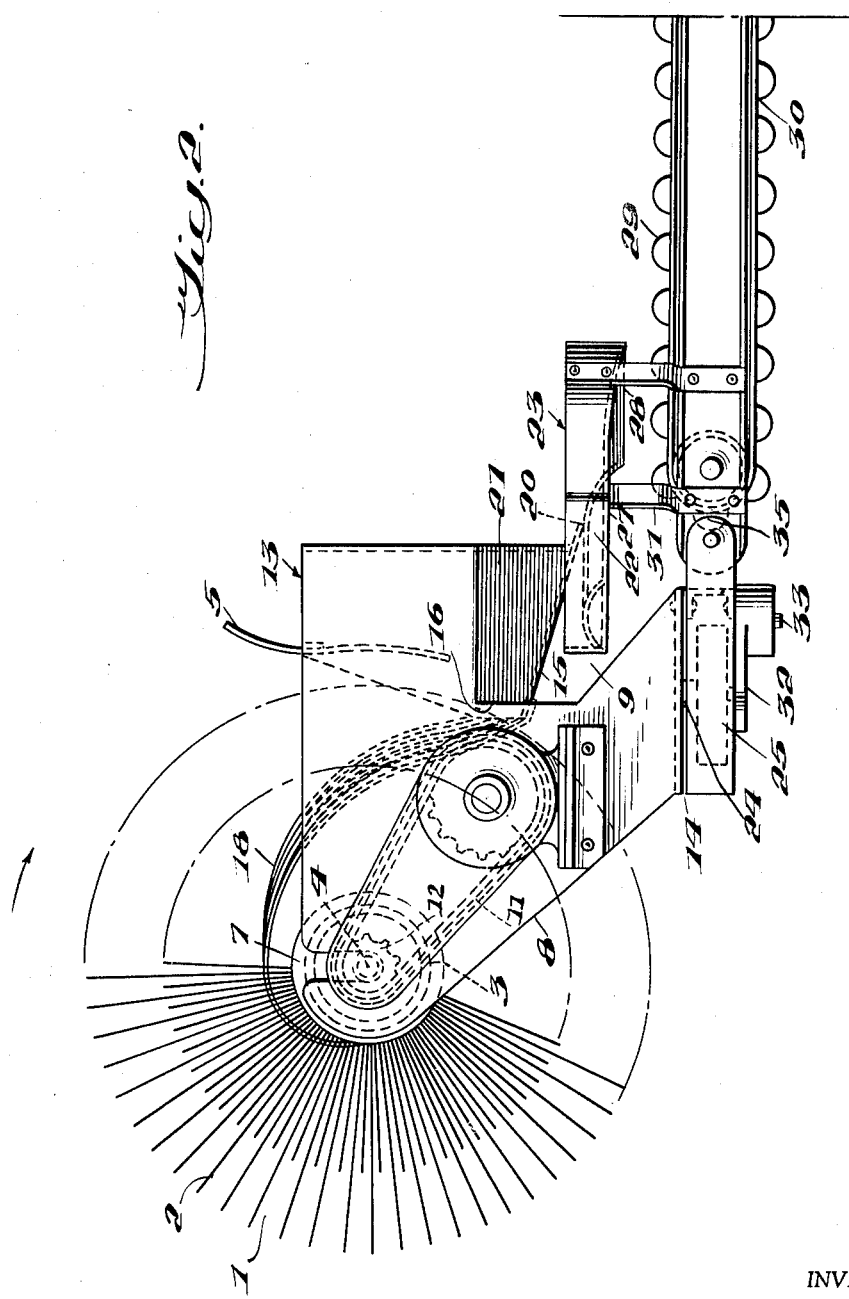

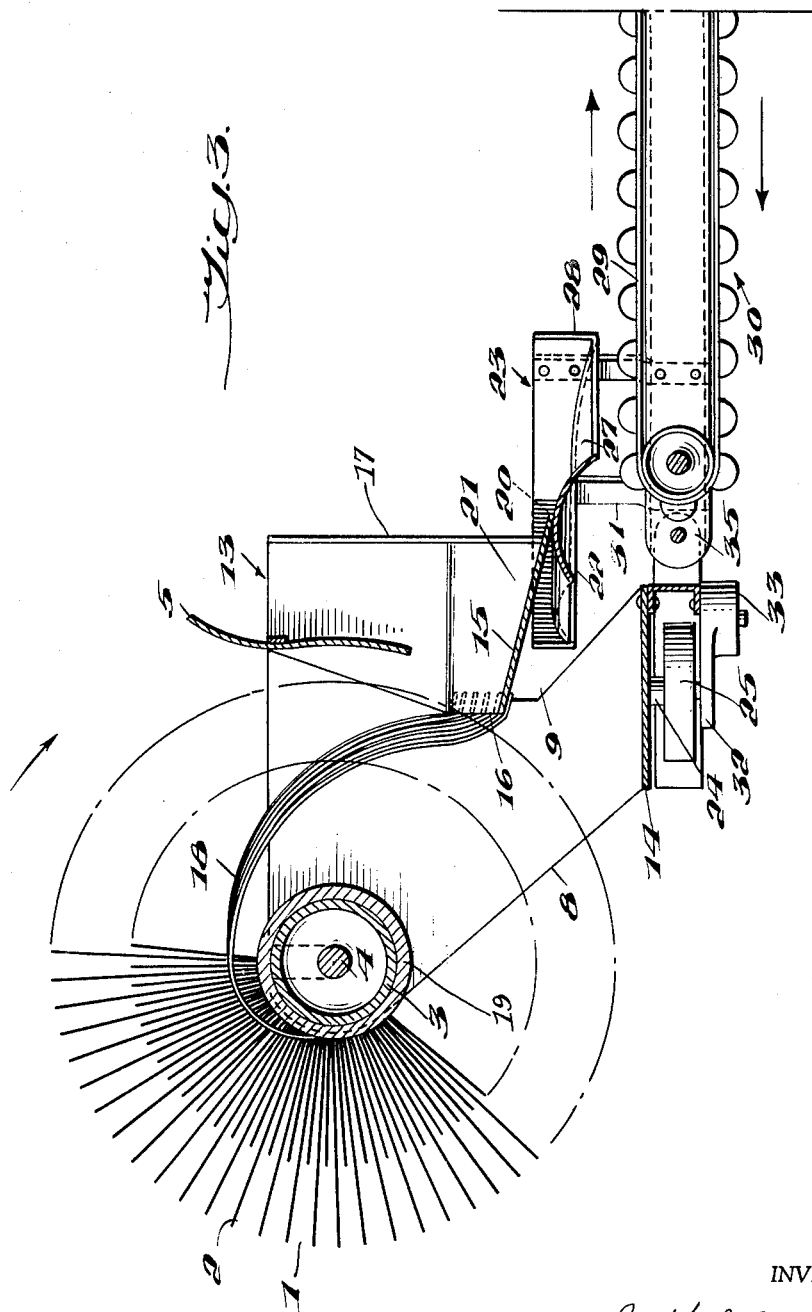

United States Patent Office 3,253,392
Patented May 31, 1966

3,253,392
FRUIT HARVESTING DEVICE
Joseph G. Barrat, Red Hill Road,
Martinsburg, W. Va. 25401
Filed Oct. 15, 1963, Ser. No. 316,242
3 Claims. (Cl. 56—328)

This invention relates to a fruit harvesting device and more particularly to such a device which removes fruit from trees, bushes, vines or the like by means of movable or rotating elements mounted on a cylinder or like device which also conveys the fruit to receiving units and further disposition.

A prime purpose of this invention is to provide a machine which will remove fruit quickly and efficiently from its place of attachment on the plant with a minimum of danger from bruising or other injury and without injury to the plant.

Another object of this invention is to provide a machine which may be somewhat selective in the fruit it removes depending upon the state of maturation of the fruit and the amount of pressure exerted upon the fruit—the more mature the fruit the more readily it will become separated from the spur or point of attachment.

Another object of this invention is to provide a mechanical unit which is simple in design and structure, efficient, power driven and relatively inexpensive.

Another object of this invention is to provide a machine which may be mounted on a movable and adjustable boom or like device so that fruit may be harvested from any approach, location or height of a tree-bush, vine or the like and is limited only by the structure of the supporting boom.

Another object of this invention is to provide a machine which is to some extent horizontally and vertically adjustable to aid in placing the harvesting unit in the most suitable position to perform the harvesting operation and to exert pressure on the fruit.

Another object of this invention is to provide a means of detaching the fruit from the tree, bush, vine or the like which may be enhanced by a minimum of pruning or shaping of the plant to conform to the size and function of the machine.

Another object of this invention is to provide a means for a continuous system of conveyance from the point of detachment of the fruit to a movable fruit receptacle and then to a stationary receptacle and then to a conveyor which will further convey the fruit to boxes, bins, crates or other temporary storage.

Another object of this invention is to provide a machine the harvesting mechanism of which will resist clogging.

Another object of this invention is to provide a machine which will require of an individual a minimum of training to become skilled in its operation.

The greater part of fruit harvesting is done by hand picking and is a relatively slow and expensive process. This invention will improve the harvesting operation by increasing the speed of harvest by use of a mechanical device of relatively low cost.

The principle of this machine may be adapted or modified to harvest small or large fruits, vegetables or the like.

With the foregoing and other objects in view which will appear as the description proceeds, this invention consists of certain novel details of construction and combinations of parts hereinafter more fully described and pointed out in the claims, it being understood that changes may be made in the construction and arrangement of parts without departing from the spirit of the invention as claimed.

Referring to the drawings:
FIGURE 1 is a top plan view of this invention.
FIGURE 2 is a side plan view of this invention.
FIGURE 3 is a sectional plan view taken substantially along the center line 3—3 of FIGURE 1.

Similar reference characters refer to similar parts throughout the several views of the drawings.

This fruit harvesting device comprises a movable rotating means 1, cylindrical in shape, with picker fingers or elongate elements 2 or the like of adequate length, firmness and terminal flexibility in which the fruit on the plant becomes imbedded or closely engaged on the upper surface of the rotating means 1 as the unit is moved into position from beneath the fruit. As the fruit becomes engaged a combination of a plurality of elements 2 creates a density great enough to exert sufficient force to disengage the fruit from its point of attachment as the movable rotating means 1 slowly rotates. The fruit, once disengaged from its point of attachment, is acted upon by the forces of gravity and remains within the confines of the elongate elements 2 or tends to fall downward among the terminally flexible elongate elements 2. The movable rotating means 1 turns in a direction from the uppermost surface portion to and past a retaining baffle means 5 and to the receiving edge 16 of the floor 15 of the movable receiving unit 13 via the shortest route, or as indicated in FIGURE 2 in a clockwise direction. The elongate elements 2 are spaced in such a manner that their density increases from their terminally flexible ends to their more internal basal portions.

The elongate elements 2 are secured to a hub 3 and shaft assembly 4 which turns on shaft bearings 6. The bearings 6 are secured adjacent flange type slots 7 in the ends of the side plate supports 8. The shaft 4 is driven in a conventional manner by a motor 10 the driving mechanism of which, such as a chain belt 11 or the like, is attached to a gear 12 on the shaft 4, prferably exterior to the shaft bearing 6 and side plate support 8 frame. The structural portions of the side plate supports 8, the movable receiving unit 13, the basal support plate 14 and the stationary receiving unit 23 are of strong lightweight material such as aluminum alloy.

The side plate supports 8 of the movable receiving unit 13 are constructed with each side plate partially enclosing an end of the movable rotating means 1 from the shaft 4 to the basal support plate 14, and from the shaft 4 to and including the side walls or plates 9 of the movable receiving unit 13. A portion of the side walls or plates beneath the floor 15 of the movable receiving unit 13 is partially cut out to permit positioning immediately therebelow as at 9 of the stationary receiving unit 23. The side plate supports 8 are continuously joined or secured to the basal support plate 14 which extends between the basal edges of the side plate supports 8.

The forward wall plate 17 of the movable receiving unit 13 is joined to the side walls or plates in the same manner as the basal support plate 14 is joined to the side plate supports 8. The forward wall plate 17 and side plate supports 8 of the movable receiving unit 13 are of similar strong, lightweight material and are of sufficient height to enclose and retain the fruit and prevent overflow.

A fruit retaining baffle 5 extends across the face of the movable rotating means 1 and is secured to each side plate support 8. The fruit retaining baffle 5 is comprised of a resilient material such as rubber and extends vertically an adequate height to retain the fruit within the confines of the movable rotating means 1 until the fruit is permitted to be expelled beneath the baffle 5 onto the floor 15 of the movable receiving unit 13. The receiving edge 16 of the floor 15 of the movable receiving unit 13 adjacent to the movable rotating means 1 is connected to the rigid stripper members 18 which function as a fruit expelling mechanism within the movable rotating means 1. The rigid stripper members 18 extend from the fiber bearings 19 on the hub 3 to the edge 16 of the floor 15 of the movable receiving unit 13. The rigid stripper members 18 are attached to circumferential fiber or like material bearings 19 which are vertically aligned between the rows of elongate elements 2. These fiber bearings 19 encircle the hub 3, thus assuring close attachment to the hub 3. The rigid stripper members 18 extend from the bearings 19 on the hub 3 in a broad upward, outward and downward curve and are secured to the edge 16 of the floor 15 of the movable receiving unit 13. The rigid stripper members 18 starting out in a low curve from bearings 19 between the bases of the elongate elements 2 from the hub 3 maintain a continuous separation of the vertically aligned elongate elements 2 as the curve of the stripper members 18 extend outward and downward to join the receiving edge 16 of the floor 15 of the movable receiving unit 13 and at the extremities of the elongate elements 2. The rigid stripper members 18 are covered with a resilient material such as latex rubber so that the possibility of injury is lessened as the fruit is engaged at the upper portion of the curve and is gradually forced from within the confines of the rotating elements 2 of the movable rotating means 1. The weight and bulk of the fruit serves to spread the elongate elements 2, however, during the movement of the rotating means 1 the fruit is expelled as the elongate elements 2 are vertically realigned and restored to their original position as they pass between the stripper members 18. The fruit is retained within the elongate elements 2 by the baffle 5 and in passing the baffle 5 the fruit is expelled onto the floor 15 of the movable receiving unit 13.

The entire inner portion of the movable receiving unit 13 is covered with soft resilient material such as foam rubber to prevent bruising. The floor 15 of the movable receiving unit 13 is inclined downward at an angle sufficiently great to permit the fruit to roll from a higher elevation at the edge 16 adjacent to the movable rotating means 1 to a lower elevation and towards the forward wall plate 17. The floor 15 of the movable receiving unit 13 is also slanted from a higher elevation on the side walls or plates to a lower elevation at the center of the floor 15 of the movable receiving unit 13 to a centrally located concave escape chute 21 the terminal edge 20 of which extends onto the curved edge 22 of the floor of the stationary receiving unit 23, and thus guides the fruit into the stationary receiving unit 23.

The edge 22 of the floor of the stationary receiving unit 23 adjacent to the movable receiving unit 13 is horizontally curved in shape equal to the angle of travel of the terminal edge 20 of the escape chute 21 of the movable receiving unit 13. The curve of this edge 22 of the floor plate of the stationary receiving unit 23 is determined by the pivot radius from the shaft 24 located in the basal support plate 14 and extending to the terminal edge 20 of the escape chute 21 of the movable receiving unit 13 which it adjoins. All interior portions of the stationary receiving unit 23 are likewise covered with a resilient material such as foam rubber to prevent bruising of the fruit. The horizontally curved receiving edge 22 of the floor of the stationary receiving unit 23 is also broadly rounded to accommodate the vertical adjustment of the movable receiving unit 13.

The curved forward and side wall plate 26 of the stationary receiving unit 23 extends across the front portion of the unit and is secured to the curved edge 22 and floor plates 27. The curved forward and side wall plate 26 is of sufficient height to contain the fruit and prevent overflow. An escape port 28 is located in the center of the curved forward and side wall plate 26 of the stationary receiving unit 23 to permit further conveyance of the fruit on an endless conveyor belt 29 or like device on the boom 30. The curved forward and side wall plate 26 is of circumferential length equal to the extent of the curvature of the curved receiving edge 22 to which it is adjoined. The sides of the curved forward and side wall plate 26 are secured to the boom 30. The floor plates 27 of the stationary receiving unit 23 are secured to and inclined downward and away from the curved receiving edge 22 to a lower elevation at the curved forward and side wall plate 26. The floor plates 27 of the stationary receiving unit 23 are also slanted from a higher elevation on the sides to a lower elevation near the center permitting the fruit to roll onto an endless conveyor belt 29 or like device separating the floor plates 27 for further conveyance of the fruit. The stationary receiving unit 23 is rigidly secured to the boom 30 by vertical support braces 31 or the like secured to the boom 30 and also secured to the sides of the curved forward and side wall plate 26 of the stationary receiving unit 23. Several types of booms are available which with some modifications may be used in conjunction with this invention.

The side plate supports 8, the movable rotating means 1, the retaining baffle 5, the rigid stripper members 18 comprising the fruit expelling mechanism, and the movable receiving unit 13 are supported by a centrally located vertical shaft 24 attached to the basal support plate 14 which is secured to the lower edges of the side plate supports 8 of the movable receiving unit 13. This shaft 24, in turn, is supported on a main bearing and gear wheel or turntable 25 of sturdy construction and held within the basal support platform 32 which is attached to the boom 30. The basal support platform 32 is constructed of strong material such as steel to bear the weight of the movable rotating means 1, the movable receiving unit 13 and other components.

A motor 33 is attached to the turntable 25 in a conventional manner to turn horizontally the movable receiving unit 13 and the movable rotating means 1 in either direction to an angle limited by the travel of the chute 21 of the movable receiving unit 13. The motor 33 is preferably attached to the underside of the basal support platform 32. The basal support platform 32 is attached to the boom 30, terminally. This attachment is by vertical pivot bearings 35 located on matching, oppositely aligned brace bars 36 located on each side of the basal support 32 or by other acceptable means. Driving means such as hydraulic cylinders or like devices and function are attached to and between the basal support platform 32 and the boom 30 by vertically descending braces to permit movement in a vertical plane of the basal support platform 32, rotating on the axis of the vertical pivot bearings 35 securing the basal support platform 32 and boom 30.

As the movable rotating means 1 and movable receiving unit 13 turns horizontally the fruit is delivered into the stationary receiving unit 23 through the chute 21 at any position along the curved receiving edge 22 of the floor of the stationary receiving unit 23 adjacent to the movable receiving unit 13. The curved receiving floor of the stationary receiving unit 23 in addition to being longitudinally curved is vertically rounded or curved as previously mentioned to accommodate the vertical and curved migration of the edge 20 of the chute 21 of the movable receiving unit 13. This vertical angle of curvature of the movement of the edge 20 of the chute 21 of movable receiving unit 13 is determined by the angle of vertical rotation determined by the location of the attaching vertical pivot bearings 35 of the basal support platform 32 to the boom 30. The curved forward and side wall plate 26 of the stationary receiving unit 23 is curved to reduce the volume of the unit, but is of sufficient size to handle a quantity of fruit as it is received from the movable receiving unit 13. The angle of curvature of the curved forward and side wall plate 26 is approximately the same as that of the curved receiving edge 22 of the floor of the stationary receiving unit 23.

The length of the curved forward and side wall plate 26 is increased to accommodate the length of the angle of curvature of the curved edge 22 of the floor at a greater diameter. The curved forward and side wall plate 26 of the stationary receiving unit 23 is of sufficient height to contain the fruit and prevent overflow, but the sides are low enough to permit the overhead passage of the lower portion or positioning of the movable receiving unit 13.

Thus, as the fruit is engaged by the elongate elements of the movable rotating means, force is exerted on the fruit which causes its disengagement from the spur. The elongate elements, the action of gravity and the retaining baffle hold the fruit in the confines of the elongate elements until the movable rotating means conveys the fruit to the escape area beneath the retaining baffle and at the edge of the floor of the movable receiving unit upon which the fruit is expelled by the curved stripper members comprising the fruit expulsion mechanism. The inclined floor of the movable receiving unit directs the fruit to a centrally located chute and port in the forward wall plate to the curved receiving edge of the stationary receiving unit. The movable rotating means and the movable receiving unit as a unit is horizontally and vertically adjustable to aid in placing the movable rotating means in close contact with the fruit and to exert pressure. Again, in the stationary receiving unit the fruit is directed by inclined floor plates to a centrally located endless conveyor belt mounted on the boom which further transports the fruit through a port in the forward and side wall plate along the boom for further conveyance and disposition. All portions of the fruit expulsion stripper members, retaining baffle, movable and stationary receiving units that come in contact with the fruit are covered with a soft resilient material to prevent bruising.

The foregoing description and accompanying drawings clearly disclose a preferred embodiment of this invention but it will be understood that this disclosure is merely illustrative and that changes may be made within the scope and spirit of the following claims.

I claim:
1. A fruit harvesting device comprising an elongated boom including a conveyor means, a movable harvesting and receiving unit pivotally mounted on one end of said boom for limited horizontal movement about said pivot, said unit including a rotary brush-like harvesting member having a plurality of radial picking elements, coacting retaining means disposed adjacent the distal ends of said elements and adapted to retain the picked fruit within the confines of said elements, and inclined floor structure disclosed below said retaining means and including portions thereof adjacent said distal ends of said elements so as to receive fruit therefrom and portions spaced from said distal ends which define a chute with a discharge outlet for said fruit, arcuate stationary receiving means incorporating a discharge port and being mounted on said boom adjacent said discharge inlet so as to receive fruit therefrom in any given adjusted position of said unit and to convey such fruit through said discharge port on to said conveyor and means on said unit for driving said harvesting member.

2. A fruit harvesting device as set forth in claim 1 wherein said unit includes a rotary hub on which said picking elements are mounted, a plurality of axially spaced bearings pivotally mounted on said hub between said picking elements and a plurality of stripper bars connected at one end to said bearings and extending radially outwardly therefrom between said picking elements with the other ends connected to an edge of said inclined floor structure.

3. A fruit harvesting device as set forth in claim 1 including a plurality of stripper members with protective coating means thereon so as to prevent injury to fruit being harvested, said unit including a rotary hub on which said picking elements are mounted, a plurality of axially spaced bearings pivotally mounted on said hub between said picking elements, said stripper members connected at one end to said bearings and at the other end to said floor structure for progressively separating said picker elements of the rotary harvesting member at the ends thereof and expelling fruit therefrom, which fruit rolls to said receiving means.

References Cited by the Examiner
UNITED STATES PATENTS

| | | | |
|---|---|---|---|
| 2,643,754 | 6/1953 | Doak | 56—328 X |
| 2,729,046 | 1/1956 | Patterson | 56—328 |
| 3,040,507 | 6/1962 | Lasswell | 56—328 |
| 3,077,720 | 2/1963 | Grove et al. | 56—328 |
| 3,127,725 | 4/1964 | Richardson | 56—328 |

ABRAHAM G. STONE, *Primary Examiner.*

RUSSELL R. KINSEY, *Examiner.*